United States Patent
Jaini et al.

(10) Patent No.: US 11,010,138 B2
(45) Date of Patent: May 18, 2021

(54) SYSTEM AND METHOD FOR PROGRAMMATICALLY CONVERTING INTERFACE SPECIFICATION TO GENERIC PLUG-IN CODE

(71) Applicant: Dell Products L. P., Round Rock, TX (US)

(72) Inventors: Pallavi Jaini, Shrewsbury, MA (US); Hung The Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/576,936

(22) Filed: Sep. 20, 2019

(65) Prior Publication Data

US 2021/0089336 A1    Mar. 25, 2021

(51) Int. Cl.
| | |
|---|---|
| *G06F 8/30* | (2018.01) |
| *G06F 9/455* | (2018.01) |
| *G06F 8/10* | (2018.01) |
| *G06F 9/54* | (2006.01) |

(52) U.S. Cl.
CPC .............. *G06F 8/30* (2013.01); *G06F 8/10* (2013.01); *G06F 9/45512* (2013.01); *G06F 9/546* (2013.01)

(58) Field of Classification Search
CPC ........ G06F 9/451; G06F 9/45512; G06F 9/54; G06F 9/541; G06F 9/546; G06F 8/10; G06F 8/30; G06F 8/36; G06F 8/76
See application file for complete search history.

(56) References Cited

U.S. PATENT DOCUMENTS

2002/0188595 A1* 12/2002 Underseth ................. G06F 8/36

OTHER PUBLICATIONS

Anonymous, "Calling Functions", Linux Shell Scripting Tutorial [online], 2016 [retrieved Sep. 14, 2020], Retrieved from the Internet: <URL: https://bash.cyberciti.biz/guide/Calling_functions>, pp. 1-3.*

(Continued)

*Primary Examiner* — Todd Aguilera
(74) *Attorney, Agent, or Firm* — Krishnendu Gupta; Deepika Bhayana; Dorothy Wu Chiang

(57) ABSTRACT

A system and method to programmatically generate an integration interface by executing a pre-defined, generic program code in place of the program code or instructions in an interface specification of a software module that is to be integrated with a larger software system. The generic program code functions as a plug-in code for the interface specification, thereby automatically converting the interface specification into the desired integration interface. The plug-in code is supplied with dynamic parameters/values obtained from the analysis of the interface specification, thereby generating a customized integration interface for the software module. Even when the developer of the software module does not fully understand the various application programming interfaces of the software system and how to integrate with them, the automated creation of the integration interface through execution of the generic code effectively rectifies programming errors, deficiencies, or inconsistencies in the integration specification provided by the software module's developer.

20 Claims, 8 Drawing Sheets

(56) References Cited

OTHER PUBLICATIONS

Shi, M.H., et al., "Message Queuing Markup Language for Enterprise Integration", Electronic Commerce Research, vol. 3 [online], 2003 [retrieved Jan. 25, 2021], Retrieved from Internet: <URL: https://link.springer.com/article/10.1023/A:1021577327262>, pp. 61-81.*

* cited by examiner

Request to create a queue
{
"comments": "string",
"endDate": "2019-06-05T20:20:32.379Z",
"environment": "string",
"payload": "string",
"requestDate": "2019-06-05T20:20:32.379Z",
"status": {
"description": "OPEN",
"id": 1
},
"user": {
"emailId": "string",
"firstName": "string",
"lastName": "string",
"userId": 0
}, The "environment" field may contain a string as below:
"server-name"
for example
server-name="abc.xyt.123.com"

The "payload" field may contain a string of following sub-fields :
"application-name, command, queue-name, queue-type, queue-manager-name, channel-name, portnum, maxdepth, maxmsgln"

for example, the contents of the above sub-fields in the "payload" field may be as follows:

application-name = "OrderProcess"; command="CreateQueue";
queue-name="Order_Input_Q";
queue-manager-name="OrderProcessQmgr"; channel-name="OrderProcess_chl";
portnum=5231; maxdepth=5000; maxmsglen=4194304

602

Input to DIM

604

//* this is the code of the executeScript
public void executeScript(){
try{
if (command=='CreateQueue')
ProcessBuilder pb = new ProcessBuilder("'/mq/script/CreateQ_script.sh'");
else if (command=='ReadQueue')
ProcessBuilder pb = new ProcessBuilder("'/mq/script/ReadQ_script.sh'");
else (command=='WriteQueue')
ProcessBuilder pb = new ProcessBuilder("'/mq/script/WriteQ_script.sh'");
Process p = pb.start();
}
}

Interface Generation

The CreateQ_script.sh may generate the command below then execute this command to create a queue of type local queue based on the information passed by the "payload" field earlier // fully generated CreateQueue command by CreateQ_script.sh //* this is the code of CreateQ_script.sh to create a queue

606

DEFINE QLOCAL (Order_Input_q) +
DESCR('Queue for OrderProcess application on host abc.xyt.123.com ') +
PUT (ENABLED) +
GET (ENABLED) +
MAXDEPTH (5000) +
MAXMSGL (4194304) +
USAGE (NORMAL);

Request to Read from a queue

{
"comments": "string",
"endDate": "2019-06-05T20:20:32.379Z",
"environment": "string",
"payload": "string",
"requestDate": "2019-06-05T20:20:32.379Z",
"status": {
"description": "OPEN",
"id": 1
},
}

702

The "environment" field may contain a string as below:
"server-name"
for example
server-name="abc.xyt.123.com"

The "payload" field may contain a string of following sub-fields:
"application-name, command, queue-name, queue-type, queue-manager-name, channel-name, portnum, maxdepth, maxmsgln"

For example, values of the above sub-fields in the "payload" field may be as follows:

application-name = "OrderVerified"; command= "ReadQueue";
queue-name="Order_Verified_Q_In";
queue-manager-name="OrderVerifiedQmgr"; channel-name=OrderVerifiedChl;
portnum=5321; maxdepth=5000; maxmsglen=4194304

→ Input to DIM

704

```
//* this is the code of the executeScript
public void executeScript(){
  try{
    if (command=='CreateQueue')
      ProcessBuilder pb = new ProcessBuilder('"/mq/script/CreateQ_script.sh");
    else if (command=='ReadQueue')
      ProcessBuilder pb = new ProcessBuilder('"/mq/script/ReadQ_script.sh");
    else (command=='WriteQueue')
      ProcessBuilder pb = new ProcessBuilder('"/mq/script/WriteQ_script.sh");
    Process p = pb.start();
  }
}
```

706

↑ Interface Generation

The ReadQ_script.sh may generate the command below then execute this command to read from a queue of type local queue based on the information passed by the "payload" field earlier The ReadQueue command generated by ReadQ_script.sh is as below:

// fully generated ReadQueue command by ReadQ_script.sh

/* this is the code of ReadQ_script.sh to read from a queue export MQSERVER=OrderVerifiedChl/TCP/abc.xyt.123.com(5321)
/appbin/mqm/samp/bin/
amqsget Order_Verified_Q_In OrderVerifiedQmgr

Request to Write to a queue

{
"comments": "string",
"endDate": "2019-06-05T20:20:32.379Z",
"environment": "string",
"payload": "string",
"requestDate": "2019-06-05T20:20:32.379Z",
"status": {
"description": "OPEN",
"id": 1
},
}

802

The "environment" field may contain a string as below:
"server-name"
for example
server-name="abc.xyt.123.com"

The "payload" field may contain a string of following sub-fields:
"application-name, command, queue-name, queue-type, queue-manager-name, channel-name, portnum, maxdepth, maxmsgln"

For example, values of the above sub-fields in the "payload" field may be as follows:

application-name = "OrderVerified"; command="WriteQueue";
queue-name="Order_Verified_Q_Out";
queue-manager-name="OrderVerifiedQmgr"; channel-name=OrderVerifiedChl;
portnum=5321; maxdepth=5000; maxmsglen=4194304

⇨ Input to DIM

```
//* this is the code of the executeScript
public void executeScript(){
  try{
    if (command=='CreateQueue')
      ProcessBuilder pb = new ProcessBuilder("'/mq/script/
CreateQ_script.sh");
    else if (command=='ReadQueue')
      ProcessBuilder pb = new ProcessBuilder("'/mq/script/
ReadQ_script.sh");
    else (command=='WriteQueue')
      ProcessBuilder pb = new ProcessBuilder("'/mq/script/
WriteQ_script.sh");
    Process p = pb.start();
  }
}
```

804

806 ⟶ The WriteQ_script.sh may generate the command below then execute this command to write to a queue of type local queue based on the information passed by the "payload" field earlier The WriteQueue command generated by WrietQ_script.sh is as below:

// fully generated WriteQueue command by WriteQ_script.sh

//*This is the code of WriteQ_script.sh to write to a queue export MQSERVER=OrderVerifiedChl/TCP/abc.xyt.123.com(5321)
/appbin/mqm/samp/bin/
amqsput Order_Verified_Q_Out OrderVerifiedQmgr ⇦ Interface Generation

SYSTEM AND METHOD FOR PROGRAMMATICALLY CONVERTING INTERFACE SPECIFICATION TO GENERIC PLUG-IN CODE

TECHNICAL FIELD

This disclosure relates generally to integrating a software module with an existing software system and more specifically to automatically (e.g., without human interaction) converting a specification of an integration interface into a corresponding generic plug-in code to thereby automatically create the integration interface.

BACKGROUND

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Modern information handling systems include many different types of consumer and commercial electronic devices such as, for example, personal computers (e.g., desktops or laptops), tablet computers, mobile devices (e.g., personal digital assistants (PDAs) or smart phones), corporate (or small business) server and data processing systems, and the like. These devices may vary in size, shape, performance, functionality, and price. In any event, almost all of these modern devices are equipped with relevant hardware and software to allow their users to access a number of different websites over the Internet and perform online transactions.

With large software systems, integrating a software module with the existing software can be a difficult task. First, the creator of the software module may not fully understand the various application programming interfaces (APIs) and how to integrate with them. Second, the integration specification provided by the creator of the software module may contain errors or may not be programmatically consistent with the software platform of the provider of the larger software system. For example, different software developers/creators may use different programming techniques and, hence, may provide inconsistent specifications even if their software modules relate to the same application (e.g., a data storage application, an invoice processing application, a sports news application, and the like). Thus, if these errors or inconsistencies cause a software module to behave badly due to improper integration with the provider's software system, the software module may cause the entire system to crash.

SUMMARY

This Summary provides a simplified form of concepts that are further described below in the Detailed Description. This Summary is not intended to identify key or essential features and should therefore not be used for determining or limiting the scope of the claimed subject matter.

The present disclosure relates to providing uniformity when integrating software modules from different software developers (or end users) into the larger software system. The automated conversion of a developer's interface specification into a corresponding generic plug-in code may facilitate a service-agnostic integration platform. In other words, the automatic creation of the integration interface as per teachings of the present disclosure may be implemented regardless of the underlying service (e.g., a data storage service, an invoice processing service, a sports news reporting service, and the like) supported by the software system. Furthermore, the software integration may be performed in an architecture-independent manner. Thus, software modules from different developers using different software architectures (or programming techniques) may be uniformly and consistently integrated into a service provider's software system for a seamless user experience. Even when a developer of a software module does not fully understand the various APIs of the software system and how to integrate with them, the automated creation of the integration interface through execution of generic plug-in code may effectively rectify any programming errors, deficiencies, or inconsistencies in the integration specification provided by the developer of the software module. It is noted that the terms "interface specification" and "integration specification" occasionally may be used interchangeably herein.

In one embodiment, the present disclosure is directed to a method, which comprises: (i) receiving, by a computing system, a specification associated with a software module that is to be integrated with a software system, wherein the specification indicates how the software module interacts with the software system; (ii) analyzing, by the computing system, the specification to identify an operation to be performed by the software module when integrated with the software system; (iii) generating, by the computing system, a command associated with the operation; and (iv) executing, by the computing system, the command to provide a system interface to enable the software module to interact with the software system. In particular embodiments, the computing system may use a pre-defined shell script to generate and execute the command. The program code for the command may be pre-defined as well. In some embodiments, as part of executing the command, the computing system may generate one or more API calls based on information obtained from the analysis of the specification, and provide the system interface comprising the one or more API calls to perform the operation. The API calls may include calls to a data integration API, a file transfer API, a messaging API, a database API, or any combination thereof.

In another embodiment, the present disclosure is directed to a computing system, which comprises: a memory storing program instructions; and a processing unit coupled to the memory and operable to execute the program instructions. In the computing system, the program instructions, when executed by the processing unit, cause the computing system to: (i) receive a specification associated with a software module that is to be integrated with a software system, wherein the specification indicates how the software module interacts with the software system; (ii) analyze the specification to identify an operation to be performed by the software module when integrated with the software system; (iii) generate a command associated with the operation; and (iv) execute the command to provide a system interface to enable the software module to interact with the software system.

In a further embodiment, the present disclosure is directed to a computer program product comprising a non-transitory computer-usable medium having computer-readable program code embodied therein, wherein the computer-readable program code is adapted to be executed by a computing system to implement a method. The method comprises: (i) receiving a specification associated with a software module that is to be integrated with a software system, wherein the specification indicates how the software module interacts with the software system; (ii) analyzing the specification to identify an operation to be performed by the software module when integrated with the software system; (iii) generating a command associated with the operation; and (iv) executing the command to provide a system interface to enable the software module to interact with the software system.

Thus, an integration interface may be automatically generated as per teachings of the present disclosure by executing a pre-defined program code in place of the program code or instructions received as part of an interface specification of a software module developed by an end user or other third-party. The pre-defined program code may be a generic program code that may function as a plug-in for the interface specification, thereby programmatically (and automatically) converting the interface specification into the desired integration interface in an efficient and cost-effective manner. As noted before, such automatic conversion also may effectively rectify any programming errors, deficiencies, or inconsistencies in the integration specification provided by the developer of the software module.

BRIEF DESCRIPTION OF THE DRAWINGS

A more complete understanding of the present disclosure may be obtained by reference to the following Detailed Description when taken in conjunction with the accompanying Drawings. For ease of discussion, the same reference numbers in different figures indicate similar or identical items.

FIGS. 6-8 show examples of how interface specifications for user requests to create a queue, read from a queue, and write to a queue, respectively, may be programmatically converted into corresponding integration interfaces by the DIM module of FIG. 1 as per particular embodiments of the present disclosure.

DETAILED DESCRIPTION

Figure 1:
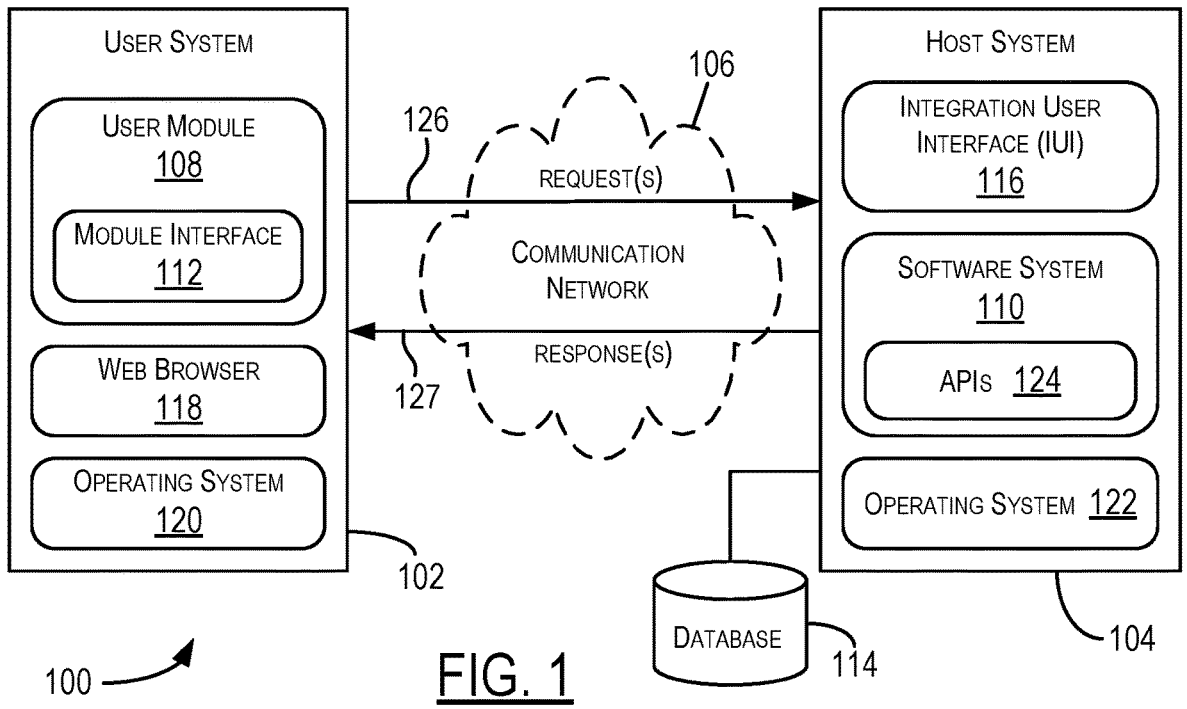
FIG. 1 shows an exemplary arrangement to implement automated conversion of an interface specification as per particular embodiments of the present disclosure.

For purpose of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, touch-screen and/or video display. The information handling system may also include one or more buses operable to transmit communications between the various hardware components.

It is noted here that, for ease of discussion, a computer software, program code or module may be referred to as "performing," "accomplishing," or "carrying out" a function or process. However, it is evident to one skilled in the art that such performance may be technically accomplished by a processor when the software or program code is executed by the processor. The program execution would cause the processor to perform the tasks or steps instructed by the software to accomplish the desired functionality or result. However, for the sake of convenience, in the discussion below, a processor or software component may be referred to interchangeably as an "actor" performing the task or action described, without technically dissecting the underlying software execution mechanism. Furthermore, a hyphenated term (e.g., "pre-defined", "computer-readable", etc.) may be occasionally interchangeably used with its non-hyphenated version (e.g., "predefined", "computer readable", etc.), and a capitalized entry (e.g., "Operating System", "Host System", etc.) may be interchangeably used with its non-capitalized version (e.g., "operating system," "host system", etc.). Such occasional interchangeable uses shall not be considered inconsistent with each other.

In a conventional system, the process of integrating a new software module with an existing software system is largely a manual process. For example, in a conventional system, a user may create the software module and then create and submit a specification. A system administrator associated with the software system may manually review the specification and determine if the requested interface can be provided. If the requested interface cannot be provided, the system administrator may deny the request and the user may (i) modify the software module, (ii) create and submit a new specification, or both. This process may be repeated until the system administrator approves the request. After the system administrator approves the request, the system administrator may manually code the system interface by incorporating (e.g., based on the specification) the appropriate API calls. Thus, in a conventional system, a system administrator may manually review the specification and manually create the system interface, which are both labor intensive (and, possibly, error-prone) tasks.

In contrast, the systems and techniques described herein automate the creation of the system interface once the administrator approves the user's request to integrate the software module. As a result, the user (e.g., a software designer/developer) may quickly and easily integrate a software module (e.g., authored by the user) into an existing software system. In some cases, the user may provide a specification to an integration user interface (IUI) and the IUI may automatically generate an integration interface that provides the software module with appropriate interface to enable the software module to work with various components of the existing software system. In other cases, the IUI may provide a wizard that asks the user various questions to determine information about the software module after which the IUI may automatically generate an integration interface. In particular embodiments, the integration interface may include calls to one or more application programming interfaces (APIs) to enable the software module to interact with the software system, such as, to perform data integration, file transfer, message queuing, database access, and the like.

In certain embodiments, an integration interface may be automatically generated by executing a pre-defined program code in place of the program code or instructions received as part of an interface specification of a software module developed by an end user or other third-party. The pre-defined program code may be a generic program code that may function as a plug-in for the interface specification, thereby programmatically (and automatically) converting the interface specification into the desired integration interface in an efficient and cost-effective manner. As noted before, such automatic conversion also may effectively rectify any programming errors, deficiencies, or inconsistencies in the integration specification provided by the developer of the software module.

FIG. 1 shows an exemplary arrangement 100 to implement automated conversion of an interface specification as per particular embodiments of the present disclosure. In the arrangement 100 of FIG. 1, a user system 102 is shown to be in communication with a host system 104 via a communication network 106 such as, for example, an Internet Protocol (IP) network. In a typical implementation, the IP network 106 may be the Internet. However, in other embodiments, the user system 102 and the remote host 104 may communicate via different types of communication networks that support bi-directional communication. For example, a developer operating the user system 102 may have access to the host system 104 via a corporate intranet or a specific communication platform made available to the developers. Thus, the user/developer may interact with the host system 104 using the user system 102. It is noted that the terms "host system", "host computer," "server system," "server," or other terms of similar import may be used interchangeably herein. Similarly, the terms "user system", "client computer", "developer system," or other terms of similar import also may be used interchangeably in the discussion below. Furthermore, the terms "user", "developer," "creator," and "end user" also may be used interchangeably herein. As noted before, the terms "interface specification" and "integration specification" may be used interchangeably herein as well.

Figure 2:
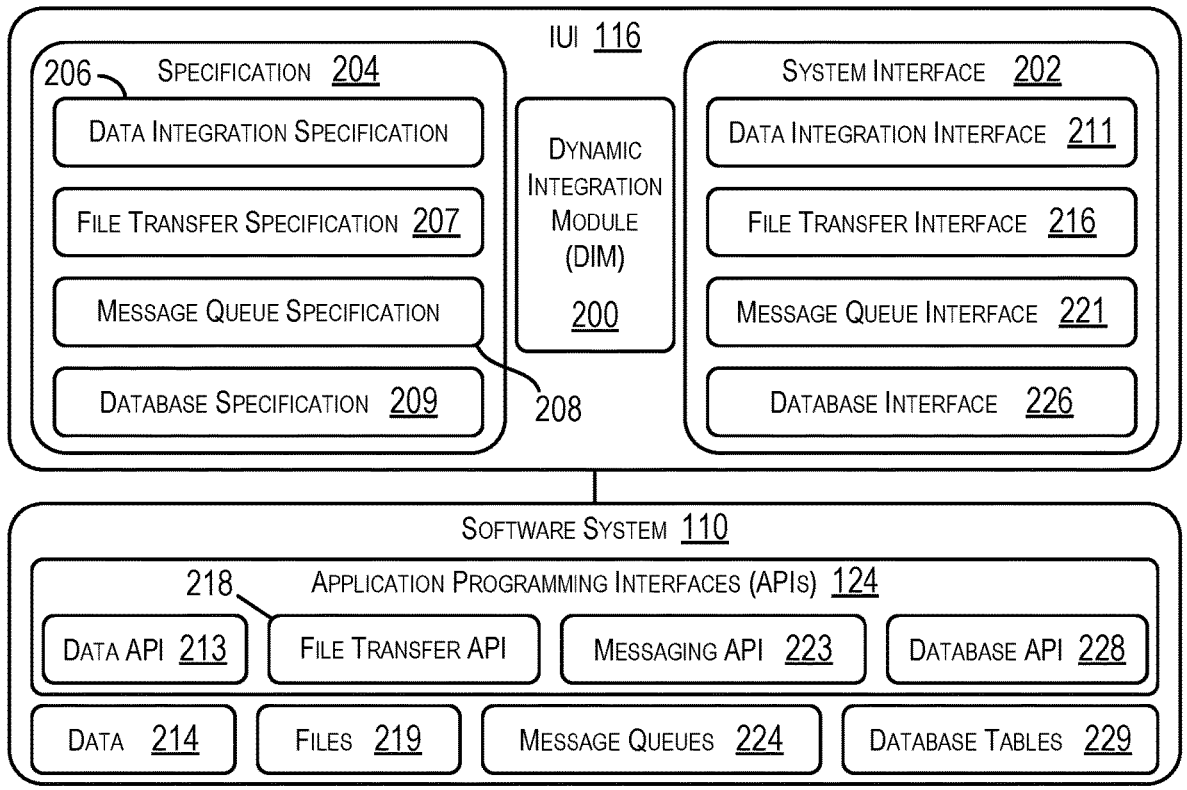
FIG. 2 depicts additional exemplary details of the IUI and the software system shown as part of the host system in FIG. 1.

The user system 102 may include a user module 108 (e.g., a software module) that is being integrated with a software system 110 at the host 104. For example, the software module 108 may implement new functionality not currently available using the software system 110. Such functionality may include, for example, improvements in invoice processing, or management of a database, or optimization of product warranty support, and the like. The software module 108 may include a module interface 112 to interface with the software system 110. For example, the software module 108 may use the module interface 112 to read data from and write data to the software system 110, transfer files to and from the software system 110, send messages to and receive messages from various modules of the software system 110, access (e.g., read from and write to) one or more databases—for example, the database 114—associated with the software system 110, perform other interactions with components of the software system 110, and the like. The module interface 112 may interact with the software system 110 using a system interface such as, for example, the system interface 202 shown in FIG. 2 and discussed later below. The terms "system interface" and "integration interface" may be used interchangeably. An integration user interface (IUI) module 116 may create the system interface based on an interface specification provided by a user (e.g., a software developer associated with the software module 108). An exemplary interface specification 204 is illustrated in FIG. 2 and discussed in more detail below. As also discussed later with reference to FIG. 2, the IUI 116 may comprise a Dynamic Integration Module (DIM) 200 that can automatically generate an integration interface by executing a pre-defined/generic program code in place of the program code or instructions received as part of the interface specification of the software module 108.

Figure 9:
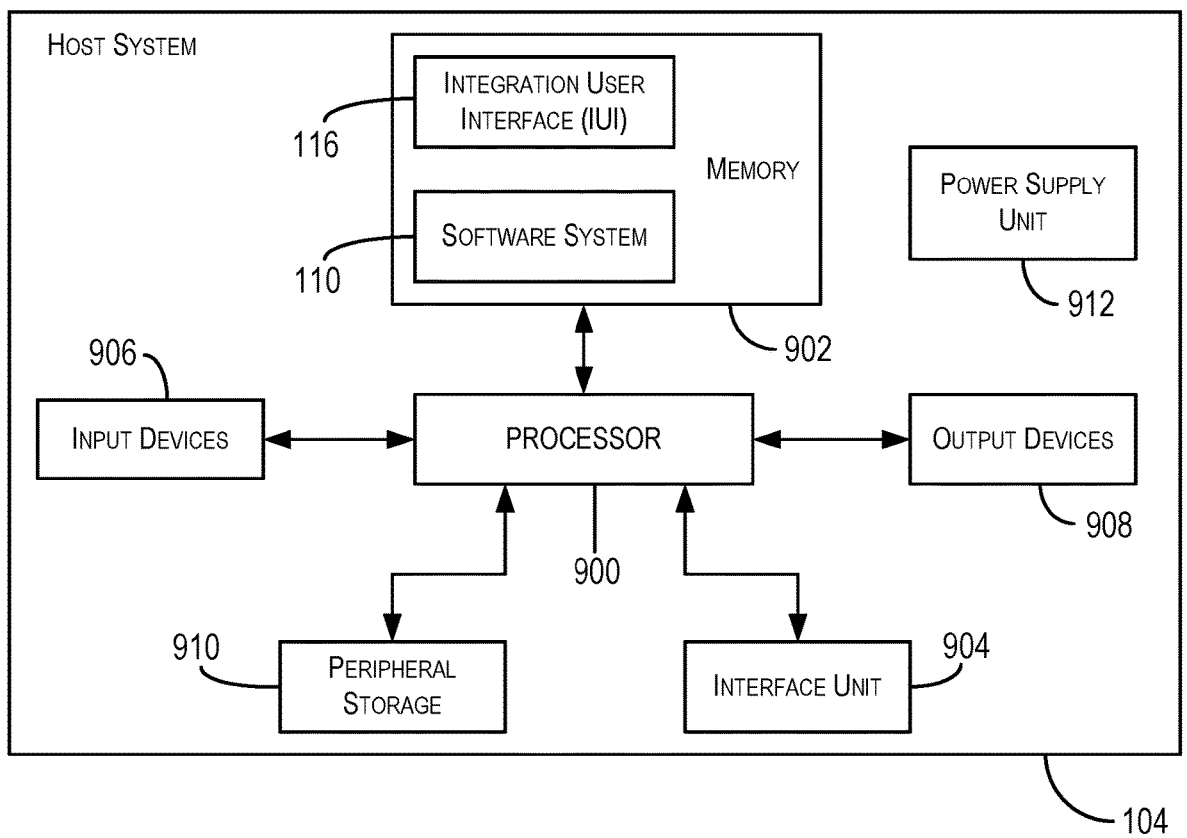
FIG. 9 illustrates an example configuration of a computer system that can be used to implement the integration user interface (IUI) described herein.

In some embodiments, the developer system 102 and the host system 104 each may be an information handling system (discussed earlier). The program code constituting the IUI module 116 (which includes the DIM module 200) may be stored in a storage unit or memory (not shown) in the host system 104. Such memory, processor, and other exemplary architectural details of the host system 104 are shown in FIG. 9 and discussed later below. In some embodiments, the IUI module 116 may be associated with one or more information handling systems (not shown) managed by a web server that coordinates content delivery to/from these information systems to the client machine 102 via a common website. The architectural configuration, layout, appearance, or content of the remote website (accessed by the user) is not relevant to the present disclosure and, hence, no additional details thereof are provided here.

In one embodiment, a user of the client computer 102 may access a website associated with the remote host 104 using the corresponding website address in a web browser 118 running on the client computer 102. It is noted here that the program code for the web browser 118 may be stored in a memory (not shown) in the client computer 102 and executed by a processor (not shown) in the client computer 102 under operative control of an Operating System (OS) 120 of the client machine 102. Similarly, the program code for the IUI module 116 as well as the software system 110 may be stored in a memory (not shown) in the host system 104 and executed by a processor (not shown) in the host system 104 under operative control of a corresponding OS 122 of the host system 104. As shown in FIG. 1 and discussed in more detail with reference to FIG. 2, the software system 110 may include a number of different APIs 124 one or more of which may be called by the integration interface (generated by the DIM module 200) to enable the user module 108 to work with various components of the existing software system 110. Although the discussion herein primarily focuses on a Microsoft® Windows® based operating systems (such as, for example, Windows XP, Windows 7, 8, or 10, and Windows NT operating systems), the automated conversion of interface specification using the DIM 200 as per the teachings of the present disclosure may be implemented in a computer system having a different operating system.

In certain embodiments, the IUI 116 in the host system 104 may cause the host system 104 to display a web page to the user through the browser 118 to enable the user to submit the interface specification (for example, as a specification document created by the user) or provide sufficient information to enable the IUI 116 to create the interface specification for the user module 108. In that regard, the host system 104 may display the web page with a number of different fields to be filled-in by the user/developer, or present a plurality of questions to the user through the web page and receive a corresponding answer for each question, or retrieve the interface specification document from the user system 102, or perform a combination of these acts to obtain the interface specification. In some embodiments, at least a portion of the content of the interface specification and/or the program code for the user module 108 (including the module interface 112) may be based on Open Source Software (OSS). As noted before, in particular embodiments, the IUI 116 may provide a wizard (through the browser 118) that asks the user various questions to determine information about the software module 108 after which the IUI 116 may automatically generate an integration interface.

In certain embodiments, to facilitate the user's access to the website hosted by the host computer 104, the web browser 118 in the client computer 102 may communicate with the host computer 104 using a request-response messaging scheme based on the Hypertext Transfer Protocol (HTTP) or the Hypertext Transfer Protocol Secure (HTTPS) if the remote website is offering an HTTPS-based communication for secure browsing experience. This request-response based HTTP/HTTPS communication is illustrated by the directional arrows 126-127 in FIG. 1 depicting web requests being sent to the server 104 and web responses being received at the client 102, respectively. For example, as part of providing interface specification in the manner discussed in the preceding paragraph, the user's browser 118 may send an HTTP request 126 containing information/data associated with one or more operations (e.g., creating a queue, writing to a queue, reading from a queue, and the like) to be performed by the user module 108 when integrated with the software system 110. The information/data may be in the form of an Extensible Mark-up Language (XML) object. The response 127—such as, for example, the generated integration interface or an intimation therefor—may be sent to the user system 102 as an HTTP response. Additional examples of the contents of interface specifications for different operations are discussed later with reference to FIGS. 6-8. In some embodiments, the browser 118 may use a POST request under HTTP/HTTPS to send the content related to interface specification to the host system 104 for further analysis. It is noted here that the POST request message may request the server system 104 to accept the data enclosed in the body of the request message, most likely for storing it in a memory or database (for example, the database 114) associated with the server system 104. In some embodiments, the database 114 may be an integral part of the server system 104. In other embodiments, the database 114 may be an external data storage unit communicatively coupled to the server 104 for storage and retrieval of data. In certain embodiments, the database 114 may be implemented in software alone, or as a combination of hardware (for example, physical storage/memory) and software that manages the hardware (for example, a database management application). Additional architectural details of the host/server system 104 are provided later with reference to discussion of FIG. 9.

Figure 3:
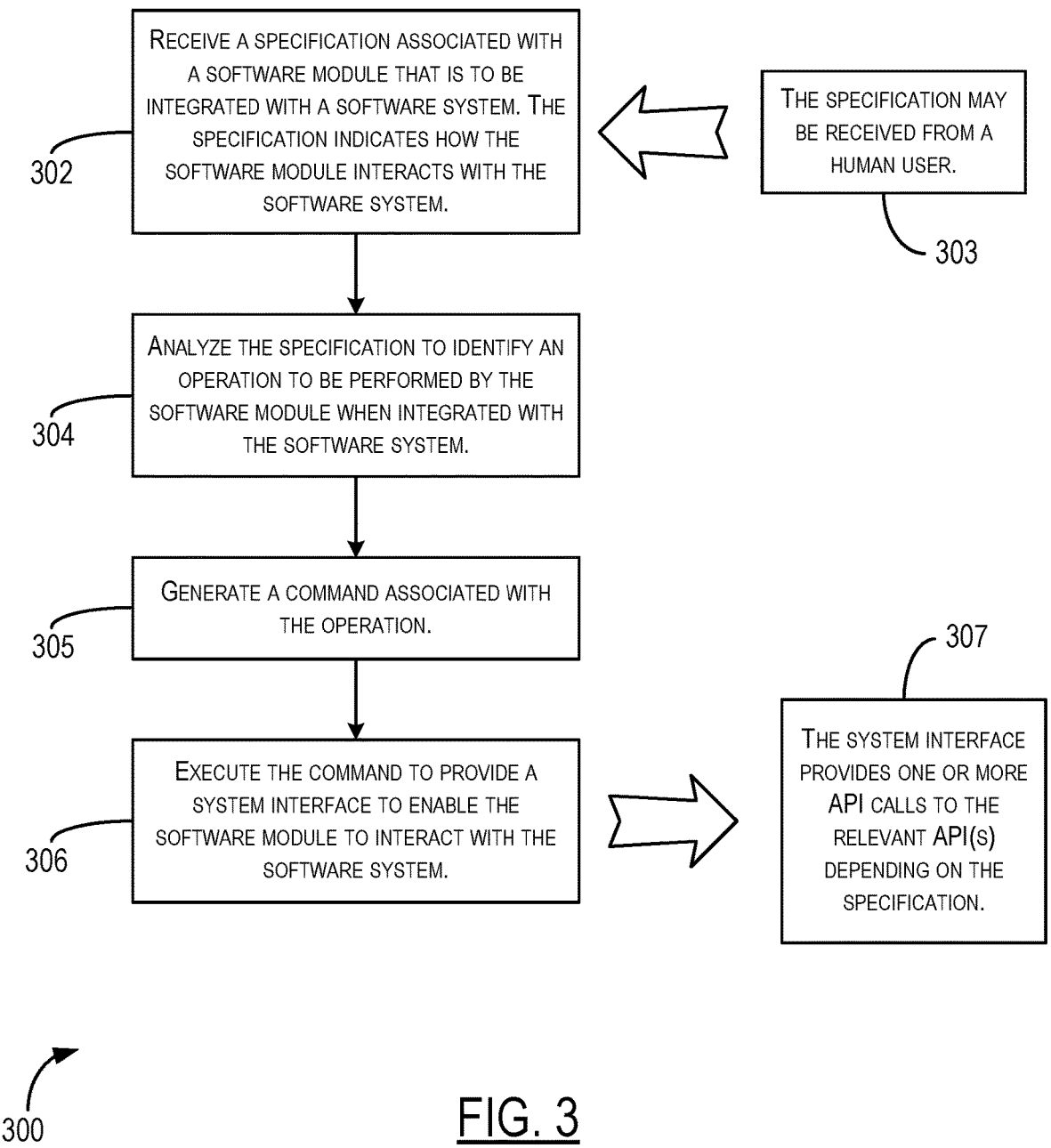
FIG. 3 is an exemplary flowchart depicting various steps that may be performed by a computing system as per particular embodiments of the present disclosure to automatically generate a system interface for a software module to be integrated with a software system.

The IUI 116 (which contains the DIM module 200) may be a software application comprising program code, which, upon execution by a processor (not shown) in the host system 104, enables the host system 104 to automatically convert the interface specification received from the user system 102 into an integration interface. More specifically, upon execution of the program code for the DIM module 200 by a processor (not shown) in the host system 104, the host system 104 may perform different operations to automatically generate an integration interface that enables the software module 108 to work with various components of the software system 110. An exemplary set of such operations is illustrated in FIG. 3, which is discussed later below. More generally, the DIM module 200, upon execution, may enable the host system 104 to receive, store, and analyze the content of the interface specification provided by the client's browser 118 (for example, through a POST request) and responsively generate the integration specification to be made available to the user/developer through the browser 118 (for example, using a POST response). As a result, the DIM module 200 (and, hence, the IUI 116) may enable the host system 104 to offer an automated platform that provides Integration as a Service (INaasS) to software developers, end users, or other third-party software suppliers.

It is noted here that the client-server based arrangement 100 shown in FIG. 1 is only one example of how an integration specification may be automatically converted into an integration interface. In some embodiments, the functionality of the IUI 116 may be implemented in a non-server system as well. The non-server system may be associated with an entity or system providing a web-based software integration facility to a remote user. Thus, the terms like "server" or "server system" are used herein by way of an example only; they should not be construed to limit the type of the system—whether operating in a server configuration or otherwise—that can be used to offer the functionality of automated conversion of an interface specification into an integration interface as per teachings of the present disclosure.

FIG. 2 depicts additional exemplary details of the IUI 116 and the software system 110 shown as part of the host system 104 in FIG. 1. As shown, the IUI 116 may include a Dynamic Integration Module (DIM) 200 to carry out an analysis of the received interface specification (or related content) and automatically generated the appropriate integration interface as discussed in more detail with reference to FIGS. 3-8. In the discussion below, although the IUI 116 may be mentioned as performing tasks related to automated generation of an integration interface, it is understood that, more specifically, such tasks may be performed by the DIM module 200. However, for ease of discussion, the IUI 116 or the DIM 200 may be interchangeably mentioned as performing such tasks. It is observed that the module interface 112 may interact with the software system 110 using a system interface (or integration interface) 202. The IUI 116 may create the system interface 202 based on an interface specification 204 provided by a user (e.g., a software developer associated with the user module 108). Thus, the system interface 202 may be a custom interface created by the IUI 116 specifically for the usage of the new software module 108. For example, as mentioned earlier, the user may provide the specification 204 by filling in fields in a form displayed on the web browser 118 by the IUI 116. To illustrate, the IUI 116 may ask the user to specify (i) a data integration specification 206 specifying the data in the software system 110 accessed by the user module 108, (ii) a file transfer specification 207 specifying the types and sizes of files being transferred between the software system 110 and the user module 108, (iii) a message queue specification 208 specifying the types and sizes of messages and message queues in the software system 110 being accessed by the user module 108, (iv) a database specification 209 specifying the database(s) in the software system 110 being accessed by the user module 108, and (v) other components of the software system 110 accessed by the user module 108. As noted earlier, in some cases, the IUI 116 may provide a wizard that asks the user questions to determine the specification 204, while in other cases, the user may provide the specification 204 in the form of a file (e.g., a document). The IUI 116 may use the specification 204 to create the system interface 202.

The IUI 116 (more specifically, the DIM 200) may analyze the specification 204 and automatically convert the specification 204 into calls to one or more APIs 124. For example, the IUI 116 may use the data integration specification 206 to create a data integration interface 211 in the system interface 202 that uses at least one data API 213 to access (e.g., read and/or write) data 214 in the software system 110. The IUI 116 may use the file transfer specification 207 to create a file transfer interface 216 in the system interface 202 that uses at least one file transfer API 218 to access (e.g., read and/or write) files 219 in the software system 110. The IUI 116 may use the message queue specification 208 to create a message queue interface 221 in the system interface 202 that uses at least one messaging API 223 to access (e.g., read and/or write) messages to one or more message queues 224 in the software system 110. The IUI 106 may use the database specification 209 to create a database interface 226 in the system interface 202 that uses at least one database API 228 to access (e.g., read and/or write) one or more database tables 229 in the software system 110. The database tables 229 may be stored in one or more databases (such as, for example, the database 114 shown in FIG. 1), which, in some embodiments, may be part of the software system 110.

In certain embodiments, the DIM 200 may analyze the specification 204 to create the system interface 202 as discussed later in more detail. For example, the DIM 200 (and, hence, the IUI 116) may analyze the interface specification 204 and automatically convert the specification 204 into calls to one or more of the APIs 124. In this manner, the IUI 116 may enable the host system 104 to automatically generate the integration interface 202.

At least one of the message queues 224 may be used by the user module 108 to communicate with a particular module of the software system 110. For example, the user module 108 may place a message in the message queue and the particular module may retrieve the message and perform one or more actions based on the message. The particular module may place a second message in the message queue and the user module 108 may retrieve the second message and perform one or more additional actions based on the second message. The file transfer API 218 may use managed file transfer or similar to transfer files. The file transfer interface 216 generated by the DMM 200 may specify the number of files to be transferred. The data API 213 may access a Global Data Integration (GDI) portion of the software system 110, the file transfer API 218 may access a Managed File Transfer (MFT), IBM® DataPower or the like portion of the software system 110, the messaging API 223 may access a message queuing portion of the software system 110, and the database API 228 may access a service oriented architecture (SOA) of a database (e.g., Oracle®, Mongo®, or the like). The IUI 116 may be integrated with a single sign-on (SSO) service for automatic user registration on first time use of a message queue. The IUI 116 may present users with options to select a particular technology. Based on the particular technology, the user can deploy, promote, retrofit a work order on a target environment with a few selections. The IUI 116 may provide the user with options to select a source application and a destination application that are to be integrated because both use the message queue to communicate with each other. The IUI 116 may programmatically retrieve the specified environment data, such as the queue manager (Qmgr), Hostname, Port, Channel, and Authorities. The DIM 200 may perform dynamic parsing of certain pre-defined data fields to determine the generic plug-in code, as discussed in more detail later with reference to FIGS. 6-8.

The specification 204 may enable specifying provisioning a new account in one or more particular MFT environments, creating transfer sites and subscriptions in an MFT environment and link the sites to the subscriptions. The IUI 116 may enable performing functions on the SOA infrastructure of the software system 110 in a self-service fashion (e.g., without a system administrator manually performing the functions), such as, for example, domain creation, domain extension, domain deletion, track creation, patching, Oracle® HTTP Server (OHS) installation and configuration, Splunk® agent installation and configuration, and the like. A request to perform an SOA function may be categorized based on work-type and may be used to automatically create a set of sub-tasks. Data may be sent to respective SOA APIs (part of the database API 228) based on the work type.

In some embodiments, the DIM module 200 may monitor the interactions between the user module 108 and the software system 110 at runtime and adjust the parameters associated with the interfaces 211, 216, 221, and 226 accordingly. For example, if the DIM module 200 detects an anomaly in terms of data integration, file transfer, message queues, database access, or the like, the DIM module 200 may dynamically (e.g., in real-time), when the software module 108 is interacting with the software system 110, modify the parameters associated with the interfaces 211, 216, 221, and 226.

Thus, a user may create a software module (such as the module 108) and begin to integrate the software module with an existing software system (such as the software system 110). The software module may include a module interface to interact (e.g., send and receive data, send and receive messages, and the like) with the software system. The user may specify an interface specification for a system interface (or integration interface) to enable the software module to interact with the software system. For example, the specification may specify data integration details, file transfer details, message queue details, database details, and the like. After receiving the specification from the user, the DIM 200 in the IUI 116 may automatically (e.g., without human interaction) convert the specification into a system interface that includes calls to various APIs in the software system. For example, the system interface may include calls to a data API, a file transfer API, a messaging API, a database API, and the like. In this way, a software programmer that makes one or more errors (e.g., a typographical error or an error due to not understanding the workings of the software system) may have the errors automatically corrected. In addition, the IUI automatically converts the specification to create a system interface with API calls, reducing or eliminating the manual process of manually checking the specification and manually creating the system interface.

FIG. 3 is an exemplary flowchart 300 depicting various steps that may be performed by a computing system as per particular embodiments of the present disclosure to automatically generate a system interface for a software module to be integrated with a software system. In one embodiment, the computing system may be the host system 104, the software module may be the user module 108, and the software system may be software system 110 shown in FIG. 1. The system interface may be the system interface 202 shown in FIG. 2. More generally, the computing system 104 performing the steps shown in FIG. 3 may include in hardware and/or software the functionality of the IUI 116 containing the DIM module 200. In one embodiment, the program code for the DIM module 200 (and other relevant program code such as the program code for the OS 122) may be executed by a processor (not shown) in the computing system 104 and, upon execution of the program code, the computing system 104 may be operative to perform the tasks illustrated in FIG. 3.

In the flowchart 300, each block represents one or more tasks that can be implemented in hardware, software, or a combination thereof. In the context of software, the blocks represent computer-executable instructions that, when executed by one or more processors, cause the processors to perform the recited tasks. Generally, computer-executable instructions include routines, programs, objects, modules, components, data structures, and the like that perform particular functions or implement particular abstract data types. The order in which the blocks are described is not intended to be construed as a limitation, and any number of the described tasks can be combined in any order and/or in parallel to implement the process shown in the flowchart 300. For discussion purpose, the process in the flowchart 300, is described with reference to FIGS. 1-2 as described above, although other models, frameworks, systems and environments may be used to implement this process.

Initially, the computing system (for example, the host system 104 in FIG. 1) may receive a specification (for example, the interface specification 204 in FIG. 2) associated with a software module (for example, the user module 108) that is to be integrated with a software system (for example, the software system 110), as noted at block 302. The specification may indicate how the software module interacts with the software system. As noted at block 303, the specification may be received from a human user such as, for example, a developer of the software module. The computing system may analyze the specification to identify an operation to be performed by the software module when integrated with the software system, as noted at block 304. The operation may be a single operation or a group of operations. For example, the software module may request to create a message queue, read from a message queue, write to a message queue, or perform a combination of these operations, when integrated with the software system. Upon identifying the operation (block 304), the computing system may generate a command associated with the operation, as noted at block 305. Thereafter, the computing system may execute the command to provide a system interface to enable the software module to interact with the software system, as noted at block 306. In some embodiments, the system interface may provide one or more API calls to the relevant API(s) depending on the specification, as noted at block 307. Three exemplary operations and corresponding commands (with their generic plug-in codes) are illustrated in FIGS. 6-8 (discussed later). In this manner, an integration interface for a developer's software module may be automatically generated to enable the software module to operationally integrate with the software system.

Figure 4:
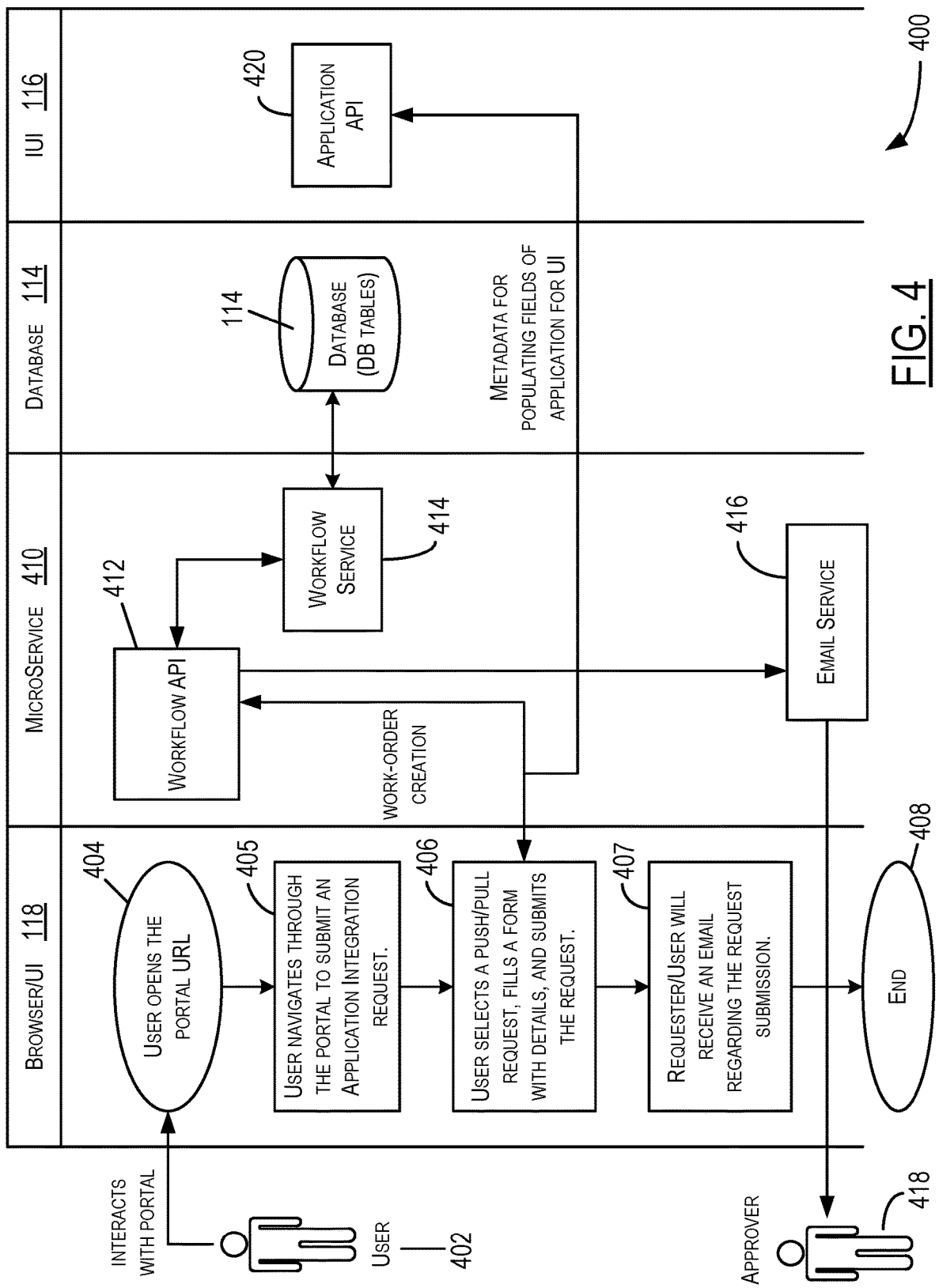
FIG. 4 depicts an exemplary flow of events when a user submits a request to integrate a software module as per particular embodiments of the present disclosure.

FIG. 4 depicts an exemplary flow of events 400 when a user 402 submits a request to integrate a software module (such as the user module 108 in FIG. 1) as per particular embodiments of the present disclosure. As discussed before, the user 402 may be the creator or developer of the software module 108, or a third-party supplier of the software module 108. Initially, at task 404 in FIG. 4, the user 402 may use the browser 118 to access a User Interface (UI) to open the Uniform Resource Locator (URL) link (or web address) of the portal (or website) where the user can provide the interface specification (or relevant content associated with the interface specification) for the software module 108. As noted before, the host system 104 may display a web page at the user-accessed portal with a number of different fields to be filled-in by the user/developer, or present a plurality of questions to the user through the web page and receive a corresponding answer for each question, or retrieve the interface specification document from the user system 102, or perform a combination of these acts to obtain the interface specification. At block 405, the user 402 may navigate through the portal/web page to submit an application integration request for the software module 108. The user 402 may select a push-pull request, fill-out a form on the web page with relevant details of the interface specification (such as the specification 204 in FIG. 2), and submit the request for integration (block 406). In response, the user/requester may receive an email confirmation of submission of the request (blocks 407-408). As shown in FIG. 4, the tasks 404-407 may be carried out using the web browser 118 in the user system 102. As discussed with reference to FIG. 1, the web browser 118 may be in communication with the host system 104 to facilitate such request submission.

When the user 402 submits the integration request through the browser 118, a microservice process 410 may call a work-flow API 412 to create a work-order for the user's request. The microservice process 410 may be part of the IUI 116 or the OS 122 in the host system 104. The workflow API 412 may access a workflow service 414 (which may be managed by the microservice process 410) to store the specification contents received with the user request into appropriate database tables in the database 114 (which, as noted before, may be implemented in software alone or as a combination of hardware and software) or other memory/data storage associated with the host system 104. For example, the interface specification document or its content received through the user request may be stored as the specification 204 to be accessed by the DIM 200 to automatically generate the integration interface 202 as discussed later. The microservice 410 also may call the workflow API 412 to access an e-mail service 416 (which may be managed by the microservice process 410 or the OS 122) to send an e-mail notification of reception of user request to an approver 418. The approver 418 may be a human operator associated with the host platform and authorized to review submissions of user requests and approve/reject the user requests from one or more users, as discussed in more detail below with reference to FIG. 5. Furthermore, based on the user's work-order, the IUI 116 may collect relevant metadata (received through the user's request) that may be supplied to an application API 420 associated with an application (for example, the DIM module 200) that may be used to generate and provide an integration interface (such as the integration interface 202) to the user 402 through the browser's UI. The metadata may include information such as, for example, the work-order number, type of integration request (e.g., data integration request, file transfer request, and the like), request identifier (if any), the user ID (if any), and the like. These metadata may be used to populate relevant fields of the browser's UI when the DIM 200 presents the integration interface 202 to the user system 102. It is noted here that the APIs (such as the workflow API 412 and the application API 420) may not be accessible to the user 402 of the client computer 102 and their execution may be transparent to the user.

Figure 5:
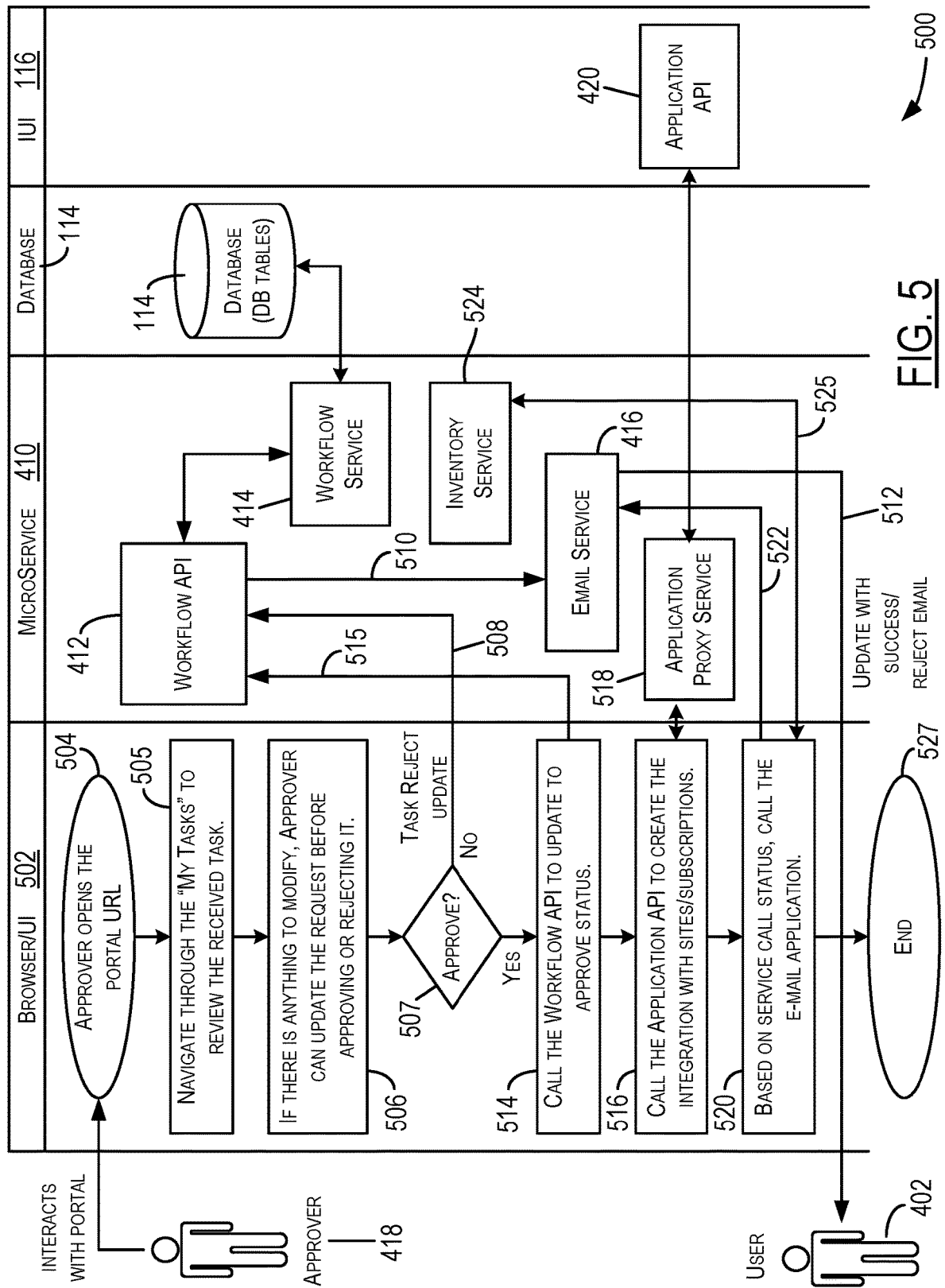
FIG. 5 shows an exemplary flow of events when a user's request to integrate a software module is reviewed as per certain embodiments of the present disclosure.

FIG. 5 shows an exemplary flow of events 500 when a user's request to integrate a software module (such as the user module 108) is reviewed as per certain embodiments of the present disclosure. The user 402 may submit the request and the approver 418 may receive an e-mail notification of system's reception of the user request as discussed with reference to FIG. 4. The approver 418 may need to approve the user request before an integration interface can be generated for the user's software module 108. Thus, the approver 418 may use a browser 502 in the host system 104 (or some other computer system connected to the host 104) to access a UI to open the URL of the portal where the approver 418 can review request submissions and act on them, as shown at task 504 in FIG. 5. The review portal may be the same as the portal provided to the user 402 for request submission, except that the authorized personnel—such as the approver 418—may be granted special access privilege to certain contents of the portal to enable the approver 418 to perform the review of user submissions. In the portal, the approver 418 may navigate through the "My Task" section (or other similar section) to review the tasks received by the system and assigned to the approver 418 for further action (block 505). The tasks may include a review of the integration requests received from users (such as the user 402) and an approval/rejection of each received request. With reference to the request from the user 402, if there is anything to modify, the approver 418 may be authorized to update the request before approving or rejecting it (block 506). For example, if the request is not fully compliant with the requirements of the portal or some content is missing, the approver 418 may modify the request to make it compliant in format and content for further processing. As another example, such modification may be carried out to reduce mistakes that someone who is not familiar with the software system 110 (or not familiar with some portions of the system 110) might make.

Once the user's request is ready for review, the approver 418 may determine at block 507 whether to approve or reject the requested integration. If the approver 418 rejects the request through the browser's 502 UI (as indicated by arrow 508 in FIG. 5), the microservice process 410 may call the work-flow API 412, which may access the workflow service 414 to update the status of the database entries associated with the user's request to "rejected" (or "declined") status. The microservice 410 also may call the workflow API 412 to access the e-mail service 416 (as indicated by arrow 510) to send an e-mail notification (as indicated by arrow 512) to the user 402 that the user's request has been rejected. On the other hand, if the approver 418 approves the user's request, the UI may receive the corresponding input from the approver and, in response, the browser 502 may call the workflow API 412, for example, through the microservice process 410, to update the status of the user's request as an "approved" request (block 514 and arrow 515). As before, the work-flow API 412 may access the workflow service 414 to update the status of the database entries associated with the user's request to "approved" (or "granted") status. In one embodiment, the workflow API 412 also may access the e-mail service 416 (as indicated by arrow 510) to send an e-mail notification (as indicated by arrow 512) to the user 402 that the user's request has been approved. Alternatively, as discussed later, the approval e-mail may be sent after the creation of the integration interface at block 516.

Upon approval of the user's request at block 507 (as indicated by a corresponding input by the approver 412 into the UI on the browser 502), the browser 502 also may call the application API 420 at block 516 to instruct the corresponding application (here, the DIM module 200) to automatically create the integration interface for the user's software module 108 to enable the software module 108 to operationally integrate with the relevant site(s)/subscription(s) (for example, a data storage site/subscription, an invoice processing site, a sports news site/subscription, and so on) offered through the host's software system 110. In particular embodiments, the browser 502 may send the service call to the application API 420 via an application proxy service 518 managed by or operating through the microservice process 410. Salient features of how an integration interface (such as, for example, the system interface 202 in FIG. 2) may be programmatically (and automatically) generated by the DIM module 200 are discussed below with reference to the examples in FIGS. 6-8.

In some embodiments, the proxy service 518 may report the status (for example, integration pending, integration completed, integration partially done, integration failed, and the like) of the service call (at block 516) to the browser 502. Based on the received status of the service call, the browser 502 may call the e-mail service 416 (as noted at block 520 and indicated by arrow 522) through the microservice process 410 to intimate the e-mail service of the service call status as well as instruct the e-mail service to provide appropriate report(s) to the user 402. For example, in the embodiment in which the "approved" status of the user request was reported earlier at block 514, the e-mail service 416 may simply report (at arrow 512) the status of the corresponding service call as received from the browser 502 at block 520. On the other hand, in the embodiment in which the request approval was not reported at block 514, the e-mail service 416 may not only report (at arrow 512) the "approved" status of the user request to the user 402 in response to the intimation at arrow 522, but also may report (at arrow 512) the status of the corresponding service call as received from the browser 502 at block 520.

In one embodiment, in addition to calling the email service 416 at arrow 522, the browser 502 also may call an inventory service 524 through the microservice process 410, as indicated by the arrow 525 in FIG. 5. The inventory service 524 may maintain an inventory or log of user modules (like the user module 108) from various users/developers that have been approved for integration with the software system 110. The inventory service 524 also may maintain a record of the latest service call status of each corresponding user module (as received by the browser 502 at block 520) through its communication with the browser 502, as indicated by arrow 525. The flow of events 500 may terminate at block 527. It is observed here that once the approver 418 approves the user request, subsequent tasks (such as, for example, the tasks at blocks 514, 516, and 520) may be performed by the host system 104 substantially automatically. Hence, the integration interface 202 may be generated programmatically and presented to the user 402 automatically once the user's request for integration is approved.

FIGS. 6-8 show examples of how interface specifications for user requests to create a queue, read from a queue, and write to a queue, respectively, may be programmatically converted into corresponding integration interfaces by the DIM module 200 of FIG. 1 as per particular embodiments of the present disclosure. The illustration 600 in FIG. 6 relates to automatic generation of an integration interface for a user request to create a queue, the illustration 700 in FIG. 7 relates to automatic generation of an integration interface for a user request to read from a queue, and the illustration 800 in FIG. 8 relates to automatic generation of an integration interface for a user request to write to a queue. As mentioned earlier, a typical user request containing information/data associated with one or more operations (e.g., creating a queue, writing to a queue, reading from a queue, and the like) to be performed by the user module 108 when integrated with the software system 110 may come in as an HTTP request 126, with raw data in the form of an XML object. The three operations—creating a queue, reading from a queue, and writing to a queue—discussed with reference to FIGS. 6-8 are for illustrative purpose only. The interface specifications associated with these operations may be considered to represent the message queue specification 208 portion of the specification 204 in FIG. 2. It is understood that similar approach may be devised to programmatically (and automatically) generate integration interfaces for other types of operations (such as, for example, a data integration operation, a file transfer operation, and the like) as well.

Referring now to FIG. 6, the pseudo code for an exemplary interface specification 602 for a request to create a queue is shown along with examples of values of different fields and sub-fields constituting the interface specification. As noted above, the interface specification 602 may be considered to represent the message queue specification 208 portion of the specification 204 in FIG. 2. The interface specification 602 (or similar content) may be input to or received by the DIM module 200 for analysis and subsequent generation of the corresponding integration interface. More generally, as part of analyzing the specification, the DIM module 200 may select one or more portions of the specification, dynamically parse the contents of the selected portion(s), and process the parsed content to identify the operation to be performed by the software module (such as the software module 108). In one embodiment, the portion(s) to be selected by the DIM module 200 may be pre-defined. For example, in the context of the interface specification 602 for the "create a queue" operation (and also for the other two operations discussed with references to FIGS. 7-8), the DIM module 200 may execute a pre-defined script, such as the "executeScript" script listed in box 604 in FIG. 6, to read the contents of the "environment" and "payload" fields, parse the contents, and process the parsed contents to check whether the operation—as specified by the "command" sub-field in the "payload" field in the interface specification 602—is a "CreateQueue", a "Read-Queue", or a "WriteQueue" operation. In one embodiment, the pre-defined script may be a part of the program code for the DIM module 200. Upon identifying the operation specified in the user request, the pre-defined script also may invoke a corresponding pre-defined shell script ("CreateQ_script.sh", "ReadQ_script.sh", or "WriteQ_script.sh") and use the invoked shell script to generate and execute the generic plug-in code for the respective command associated with the identified operation. This generic plug-in code of the respective command may be then executed in place of any similar operational code or program instructions provided as part of the user-submitted interface specification to generate the integration interface.

In the context of the "CreateQueue" operation in FIG. 6, the "CreqteQ_script.sh" shell script may generate the "CreateQueue" command as shown at box 606 in FIG. 6. The generic, pre-defined plug-in code for the "CreateQueue" command is also given in the box 606. In one embodiment, the generated command—here, the "CreateQueue" command—may be executed based on dynamic parameters passed to various instruction fields of the command. In other words, when the DIM module 200 analyzes the user's interface specification 602, the DIM module 200 may dynamically select appropriate values from the specification 602 to be provided as corresponding inputs to the generic plug-in code at block 606. In the embodiment of FIG. 6, such dynamically-selected values include values for the command lines "DESCR", "MAXDEPTH", and "MAXMSGL" in the block 606. These values correspond to the values for relevant sub-fields in the "environment" and "payload" fields in the user specification 602. The shell script may execute the generic code at block 606 with these values input thereto, thereby executing the corresponding command (here, the "CreateQueue" command) to programmatically (and automatically) generate an integration interface that implements the user-requested operation of creating a queue. In the embodiment of FIG. 6, the executed command at block 606 may create a queue of type "local queue" based on the information dynamically passed by the "payload" field in the specification 602. In one embodiment, the executed command at block 606 may form a part of the message queue interface 221 shown in FIG. 2. It is noted that, as part of the command execution at block 606, the DIM module 200 may generate one or more API calls based on information obtained from the analysis of the specification 602, and also may provide the system interface 202 (more specifically, the message queue interface 221) comprising the generated one or more API calls to enable the user's software module 108 to perform the requested operation (here, the operation of creating a queue) when integrated with the host's software system 110. In the context of the embodiments in FIGS. 6-8, such API calls may comprise at least one call to the message queue (or messaging) API 223 shown in FIG. 2. In other embodiments with other types of user-requested operations, the API calls may comprise at least one call to the data integration API 213, the file transfer API 218, or the database API 228.

As mentioned before, the illustration 700 in FIG. 7 relates to automatic generation of an integration interface for a user request to read from a queue, and the illustration 800 in FIG. 8 relates to automatic generation of an integration interface for a user request to write to a queue. The blocks 702, 704, and 706 in FIG. 7, and the blocks 802, 804, and 806 in FIG. 8 correspond to the blocks 602, 604, and 606 in FIG. 6. Although the interface specifications 702, 802, and corresponding operations addressed in FIGS. 7-8, respectively, are different from those discussed with reference to FIG. 6, and although the final commands at blocks 706, 806 in FIGS. 7-8, respectively, are different from that at block 606 in FIG. 6, the overall approach of programmatically converting the user's interface specification into a corresponding generic plug-in code is the same in each of the FIGS. 6-8. Therefore, the earlier discussion of FIG. 6 remains applicable to FIGS. 7-8, albeit with suitable modifications pertaining to each corresponding operation in FIGS. 7-8 (reading from a queue or writing to a queue). Hence, for the sake of brevity, the embodiments in FIGS. 7-8 are not discussed in detail herein.

From the examples in FIGS. 6-8, it is seen that the present disclosure's approach of programmatically generating an integration interface using a generic (pre-defined) plug-in code for a software command identified to carry out the software operation requested in a user's interface specification may bring uniformity and consistency in the process of integrating software modules from different users/developers. The plug-in code may be supplied with dynamic parameters/values obtained from the analysis of the user's interface specification, thereby generating a customized integration interface for the user's software module. Thus, software modules from different developers using different software architectures (or programming techniques) may be automatically and efficiently integrated into a service provider's software system for a seamless user experience. Even when a developer of a software module does not fully understand the various APIs of the software system and how to integrate with them, the automated creation of the integration interface through execution of generic plug-in code may effectively rectify any programming errors, deficiencies, or inconsistencies in the integration specification provided by the developer of the software module.

FIG. 9 illustrates an example configuration of a computer system, such as the host computer 104, that can be used to implement the IUI 116 described herein. As discussed before, the IUI 116 may contain the DIM module 200 to facilitate automatic conversion of interface specifications provided by users/developers of software modules into respective integration interfaces for smooth functioning of the software modules when integrated with a software system (such as the software system 110) provided by the host computer 104. The computer system (or computing device) 104 may be suitably configured to implement the functionality of the IUI 116 (and, hence, the DIM module 200) according to the teachings of the present disclosure. The computer system 104 may include one or more processors 900, a memory unit 902, an interface unit 904 providing communication interfaces, one or more input devices 906, one or more output devices 908, and a peripheral storage unit 910, connected to the processor 900 as shown and configured to communicate with each other, such as via one or more system buses (not shown) or other suitable connection.

In one embodiment, the input devices 906 may provide operator inputs—such as, for example, the interactions of the approver 418 with the portal as shown and discussed with reference to FIG. 5—to the processor 900 and the IUI 116 for further processing. The input devices 906 may include, for example, a touchpad, a camera, a computer keyboard, a touch-screen, a joystick, a physical or virtual "clickable button," a computer mouse/pointing device, and the like. A display screen is an example of the output device 908. Other examples of an output device include a graphics/display device, a computer screen or monitor, an alarm system, or any other type of data output device. In some embodiments, the input device(s) 906 and the output device(s) 908 may be coupled to the processor 900 via an I/O or peripheral interface(s). In some embodiments, the computer system 104 may include more than one instance of the devices shown. In various embodiments, all of the components shown in FIG. 9 may be housed within a single housing. In other embodiments, the computer system 104 may not include all of the components shown in FIG. 9. Furthermore, the computing device 104 may be configured as a standalone system, as a server system, as a client system (of another server), or in any other suitable form factor.

The processor 900 is a hardware device that may include a single processing unit or a number of processing units, all of which may include single or multiple computing units or multiple cores. When the computing device 104 is a multi-processor system, there may be more than one instance of the processor 900 or there may be multiple other processors coupled to the processor 900 via their respective interfaces (not shown). The processor 900 may include an integrated Graphics Processing Unit (GPU) or the GPU may be a separate processor device in the system 104. The processor 900 may be implemented as one or more microprocessors, microcomputers, microcontrollers, Digital Signal Processors (DSPs), Central Processing Units (CPUs), Graphics Processing Units (GPUs), state machines, logic circuitries, and/or any devices that manipulate signals based on operational instructions. Among other capabilities, the processor 900 may be configured to fetch and execute computer-readable instructions stored in the memory 902, the peripheral storage 910, or other computer-readable media. In some embodiments, the processor 900 may be a System on Chip (SoC).

The memory 902 and the peripheral storage unit 910 are examples of non-transitory computer media (e.g., memory storage devices) for storing instructions that can be executed by the processor 900 to perform the various functions described herein. For example, the memory unit 902 may include both volatile memory and non-volatile memory (e.g., RAM, ROM, or the like) devices. Further, in particular embodiments, the peripheral storage unit 910 may include one or more mass storage devices such as, for example, hard disk drives, solid-state drives, removable media, including external and removable drives, memory cards, flash memory, floppy disks, optical disks (e.g., CD, DVD), a storage array, a network attached storage, a storage area network, or the like. Both memory 902 and mass storage devices constituting the peripheral storage 910 may be collectively referred to as "memory" or "computer storage media" herein, and may be a media capable of storing computer-readable, processor-executable program instructions as computer program code that can be executed by the processor 900 as a particular machine configured for carrying out the operations and functions described in the implementations herein. In some embodiments, the database 114 (FIG. 1) may be a part of such computer storage media.

The computing device 104 may also include one or more communication interfaces as part of its interface unit 904 for exchanging data via a network (such as the communication network 106 in FIG. 1). The communication interfaces can facilitate communications within a wide variety of networks and protocol types, including wired networks (e.g., Ethernet, Digital Subscriber Loop (DSL), Data Over Cable Service Interface Specification (DOCSIS), Fiber Optics network, Universal Serial Bus (USB), etc.) and wireless networks (e.g., Wireless Local Area Network (WLAN), Global System for Mobile Communications (GSM), Code Division Multiple Access (CDMA), Institute of Electrical and Electronics Engineers (IEEE) standard 802.11, Bluetooth®, Wireless USB, cellular, satellite, etc.), the Internet (or, more generally, the IP network 106), and the like. Communication interfaces in the interface unit 904 can also provide communication with external storage (not shown in FIG. 9), such as in a storage array, network attached storage, storage area network, one or more databases, or the like. For example, if the database 114 in FIG. 1 is implemented as an external storage, the interface unit 904 may facilitate communication with the database 114.

The computer storage media, such as the memory 902 and the mass storage devices in the peripheral storage 910, may be used to store software and data. For example, the computer storage media may be used to store the operating system (OS) 122 for the computing device 104, various device drivers for the device 104, various inputs provided by the operator (such as the approver 418) during the implementation stages in FIG. 5 or received from the client/developer system 102 (for example, an interface specification or similar content associated with the user module 108) at run-time, and the data such as audio content, video content, text data, streaming content, or any other type of content. The computer storage media also may store software applications such as a word processing application, a spreadsheet application, the IUI module 116, the software system 110, and the like. The program code for the software applications and the OS may be executed by the processor 900.

In one embodiment, a non-transitory, computer-readable data storage medium, such as, for example, the system memory 902 or the peripheral data storage unit 910 may store program code or software for the IUI 116 and the software system 110 as per particular embodiments of the present disclosure. In the embodiment of FIG. 9, the system memory 902 is shown to include such program code. In the embodiment of FIG. 9, the IUI module 116 and the software system 110 may operate in conjunction with the server OS 122 (FIG. 1). The processor 900 may be configured to execute the program code for the IUI 116, whereby the server computer (or computing device) 104 may be operative to perform various software integration tasks associated with the IUI 116 in general, and the DIM module 200 in particular, as per the teachings of the present disclosure. In particular embodiments, such tasks may include, for example, the process steps illustrated in FIG. 3 as well as other tasks discussed with reference to FIGS. 2 and 4-8 such as, for example, reception of an interface specification for a software module (such as the user module 108) to be integrated with a host-based software system (such as the software system 110), analysis of the received specification, programmatically converting the specification into a corresponding generic plug-in code, executing the plug-in code to automatically generate an integration interface for the software module, and so on. The program code or software for the IUI 116 may be proprietary software or open source software which, upon execution by the processor 900, may enable the computer system 104 to perform operations to programmatically generate an integration interface as per teachings of the present disclosure.

In particular embodiments, the computing device 104 may include an on-board power supply unit 912 to provide electrical power to various system components illustrated in FIG. 9. The power supply unit 912 may receive batteries and/or may be connectable to an AC electrical power outlet. In one embodiment, the power supply unit 912 may convert solar energy or other renewable energy into electrical power.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability, and, hence, are considered machine-implemented. Generally, any of the functions described with reference to the figures can be implemented using software, hardware (e.g., fixed logic circuitry) or a combination of these implementations. The terms "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions), such as the program code for the IUI module 116 (as well as the DIM module 200), that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations or embodiments, as described and as illustrated in the drawings. However, this disclosure is not limited to the implementations described and illustrated herein, but can extend to other implementations, as would be known or as would become known to those skilled in the art. Reference in the specification to "one embodiment," "particular embodiments," "this implementation," "some embodiments", or other terms of similar import, means that a particular feature, structure, or characteristic described is included in at least one implementation or embodiment, and the appearances of these phrases in various places in the specification are not necessarily all referring to the same implementation/embodiment.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
   receiving, by a computing system, an eXtended Markup Language (XML) object comprising a specification associated with a software module that is to be integrated with a software system, wherein the specification indicates how the software module interacts with the software system including:
      a file transfer specification specifying one or more file sizes and one or more file types to be transferred between the software system and the software module; and
      a message queue specification specifying one or more message types, one or more message sizes, and one or more message queues to be accessed by the software module;
   analyzing, by the computing system, the specification to identify an operation to be performed by the software module when integrated with the software system;

generating, by the computing system, a command associated with the operation; and executing, by the computing system, the command to provide a system interface to enable the software module to interact with the software system.

2. The method of claim 1, wherein receiving the specification comprises at least one of the following:

displaying a plurality of fields to be filled in;

presenting a plurality of questions and receiving a corresponding answer for each question of the plurality of questions; and retrieving a specification document.

3. The method of claim 1, wherein analyzing the specification comprises:

selecting, by the computing system, one or more portions of the specification;

parsing, by the computing system, a content of the selected one or more portions; and processing, by the computing system, the parsed content to identify the operation to be performed by the software module.

4. The method of claim 3, wherein the one or more portions are pre-defined.

5. The method of claim 1, wherein generating the command comprises:

providing, by the computing system, the identified operation as an input to a pre-defined script;

executing, by the computing system, the pre-defined script to invoke a pre-defined shell script associated with the command; and using, by the computing system, the pre-defined shell script to generate the command.

6. The method of claim 1, further comprising:

using, by the computing system, a pre-defined shell script to generate and execute the command based on dynamic parameters passed.

7. The method of claim 1, wherein program code for the command is pre-defined, and wherein executing the command comprises:

providing, by the computing system, values obtained dynamically from the analysis of the specification as an input to the program code; and executing, by the computing system, the program code with the values input thereto.

8. The method of claim 1, wherein executing the command comprises:

generating, by the computing system, one or more application programming interface (API) calls based on information obtained from the analysis of the specification; and providing, by the computing system, the system interface comprising the one or more API calls to perform the operation.

9. The method of claim 1, wherein the system interface comprises:

a data integration API to access a global data integration (GDI) portion of the software system;

a file transfer API to access a managed file transfer (MFT) portion of the software system;

a message queue API to access at least one message queue of the software system; and a database API to access a service oriented architecture (SOA) of at least one database of the software system.

10. A computing system comprising:

a memory storing program instructions; and a processing unit coupled to the memory and operable to execute the program instructions, which, when executed by the processing unit, cause the computing system to:

receive an eXtended Markup Language (XML) object comprising a specification associated with a software module that is to be integrated with a software system, wherein the specification indicates how the software module interacts with the software system including:

a file transfer specification specifying one or more file sizes and one or more file types to be transferred between the software system and the software module; and a message queue specification specifying one or more message types, one or more message sizes, and one or more message queues to be accessed by the software module;

analyze the specification to identify an operation to be performed by the software module when integrated with the software system;

generate a command associated with the operation; and execute the command to provide a system interface to enable the software module to interact with the software system.

11. The computing system of claim 10, wherein the program instructions, upon execution by the processing unit, cause the computing system to perform the following as part of receiving the specification:

display a plurality of fields to be filled in;

present a plurality of questions and receiving a corresponding answer for each question of the plurality of questions; and retrieve a specification document.

12. The computing system of claim 10, wherein the program instructions, upon execution by the processing unit, cause the computing system to perform the following as part of analyzing the specification:

select one or more pre-defined portions of the specification;

parse a content of the selected one or more portions; and process the parsed content to identify the operation to be performed by the software module.

13. The computing system of claim 10, wherein the program instructions, upon execution by the processing unit, cause the computing system to perform the following as part of generating the command:

provide the identified operation as an input to a pre-defined script;

execute the pre-defined script to invoke a pre-defined shell script associated with the command; and use the pre-defined shell script to generate the command.

14. The computing system of claim 13, wherein the program instructions, upon execution by the processing unit, cause the computing system to perform the following as part of executing the command:

provide values obtained dynamically from the analysis of the specification as an input to a program code for the command; and use the pre-defined shell script to execute the program code with the values input thereto.

15. The computing system of claim 10, wherein the program instructions, upon execution by the processing unit, cause the computing system to perform the following as part of executing the command:

generate one or more application programming interface (API) calls based on information obtained from the analysis of the specification, wherein the one or more API calls comprise at least one call to:
a data integration API to access a global data integration (GDI) portion of the software system,
a file transfer API to access a managed file transfer (MFT) portion of the software system,
a message queue API to access at least one message queue of the software system, or
a database API to access a service oriented architecture (SOA) of at least one database of the software system; and
provide the system interface comprising the one or more API calls to perform the operation.

16. A computer program product comprising a non-transitory computer-usable medium having computer-readable program code embodied therein, the computer-readable program code adapted to be executed by a computing system to implement a method comprising:
receiving an eXtended Markup Language (XML) object comprising a specification associated with a software module that is to be integrated with a software system, wherein the specification indicates how the software module interacts with the software system including:
a file transfer specification specifying one or more file sizes and one or more file types to be transferred between the software system and the software module; and
a message queue specification specifying one or more message types, one or more message sizes, and one or more message queues to be accessed by the software module;
analyzing the specification to identify an operation to be performed by the software module when integrated with the software system;
generating a command associated with the operation; and
executing the command to provide a system interface to enable the software module to interact with the software system.

17. The computer program product of claim 16, wherein the method further comprises at least one of the following:
displaying a plurality of fields to be filled in;
presenting a plurality of questions and receiving a corresponding answer for each question of the plurality of questions; and
retrieving a specification document.

18. The computer program product of claim 16, wherein the method further comprises:
selecting one or more pre-defined portions of the specification;
parsing a content of the selected one or more portions; and
processing the parsed content to identify the operation to be performed by the software module.

19. The computer program product of claim 16, wherein the method further comprises:
providing the identified operation as an input to a pre-defined script;
executing the pre-defined script to invoke a pre-defined shell script associated with the command;
using the pre-defined shell script to generate the command with a pre-defined program code;
providing values obtained dynamically from the analysis of the specification as an input to the program code; and
using the shell script to execute the program code with the values input thereto.

20. The computer program product of claim 16, wherein the method further comprises:
generating one or more application programming interface (API) calls based on information obtained from the analysis of the specification, wherein the one or more API calls comprise at least one call to:
a data integration API to access a global data integration (GDI) portion of the software system,
a file transfer API to access a managed file transfer (MFT) portion of the software system,
a message queue API to access at least one message queue of the software system, or
a database API to access a service oriented architecture (SOA) of at least one database of the software system; and
providing the system interface comprising the one or more API calls to perform the operation.

* * * * *